(12) United States Patent
Cammack

(10) Patent No.: US 11,566,963 B2
(45) Date of Patent: Jan. 31, 2023

(54) FLUID STORAGE TESTING APPARATUS, SYSTEMS, AND METHODS

(71) Applicant: Westmor Industries, LLC, Morris, MN (US)

(72) Inventor: Aaron Cammack, Morris, MN (US)

(73) Assignee: Westmor Industries, LLC, Morris, MN (US)

( * ) Notice: Subject to any disclaimer, the term of this patent is extended or adjusted under 35 U.S.C. 154(b) by 227 days.

(21) Appl. No.: 16/989,537

(22) Filed: Aug. 10, 2020

(65) Prior Publication Data

US 2021/0041326 A1   Feb. 11, 2021

Related U.S. Application Data

(60) Provisional application No. 62/884,319, filed on Aug. 8, 2019.

(51) Int. Cl.
| | |
|---|---|
| *G01M 3/00* | (2006.01) |
| *G01M 3/32* | (2006.01) |
| *C02F 1/40* | (2006.01) |
| *B01D 17/02* | (2006.01) |
| *B01D 36/00* | (2006.01) |

(52) U.S. Cl.
CPC ....... *G01M 3/3245* (2013.01); *B01D 17/0214* (2013.01); *B01D 36/003* (2013.01); *C02F 1/40* (2013.01); *B01D 2221/08* (2013.01)

(58) Field of Classification Search
CPC .. B01D 17/02; B01D 17/0214; B01D 36/003; B01D 36/04; B01D 2221/08; C02F 1/40; G01M 3/32; G01M 3/3245

USPC .. 210/167.01, 167.31, 172.1, 241, 258, 259, 210/804, 805, 806; 73/49.2
See application file for complete search history.

(56) References Cited

U.S. PATENT DOCUMENTS

| | | | | |
|---|---|---|---|---|
| 1,202,347 | A * | 10/1916 | Wotherspoon | G01M 3/26 73/49.2 |
| 3,731,802 | A * | 5/1973 | James | B01D 17/0211 210/804 |
| 3,878,094 | A * | 4/1975 | Conley | B01D 17/0214 210/104 |
| 3,923,658 | A * | 12/1975 | Lancaster | B01D 36/04 210/167.31 |
| 5,098,580 | A * | 3/1992 | Andersen | B67D 7/76 210/241 |
| 5,319,956 | A * | 6/1994 | Bogle | G01M 3/3245 73/49.2 |
| 5,374,352 | A * | 12/1994 | Pattee | B08B 3/14 210/167.31 |

(Continued)

OTHER PUBLICATIONS

"Mobile Oil Water Separators", Pacific Marine & Industrial, website http://www.pacificmarine.net/engineering/oil-water-separators/industrial-oil-water-separators-mobile.htm, 2017, 1 page.

(Continued)

*Primary Examiner* — Christopher Upton
(74) *Attorney, Agent, or Firm* — Larkin Hoffman Daly & Lindgren, Ltd.

(57) ABSTRACT

Fluid storage testing systems, methods and apparatus are disclosed. One or more embodiments include a closed-circuit storage volume testing system for testing a storage volume. The system may include a water tank, a pump and an oil/water separator.

10 Claims, 2 Drawing Sheets

(56) References Cited

U.S. PATENT DOCUMENTS

| | | | | |
|---|---|---|---|---|
| 5,407,564 | A * | 4/1995 | Thrailkill | C02F 3/1242 |
| | | | | 210/167.31 |
| 5,948,244 | A * | 9/1999 | Fortier | B01D 17/0214 |
| | | | | 210/167.01 |
| 6,406,634 | B1 * | 6/2002 | Armes | C02F 1/28 |
| | | | | 210/805 |
| 2013/0284422 | A1 * | 10/2013 | Irvine | E21B 37/00 |
| | | | | 210/167.01 |
| 2017/0183859 | A1 * | 6/2017 | DeChard | C02F 1/40 |

OTHER PUBLICATIONS

"Model OSF—Above Grade Fiberglass Oil Water Separator Systems", Pan America Environmental, Inc., Brochure, 2019, 4 pages.

* cited by examiner

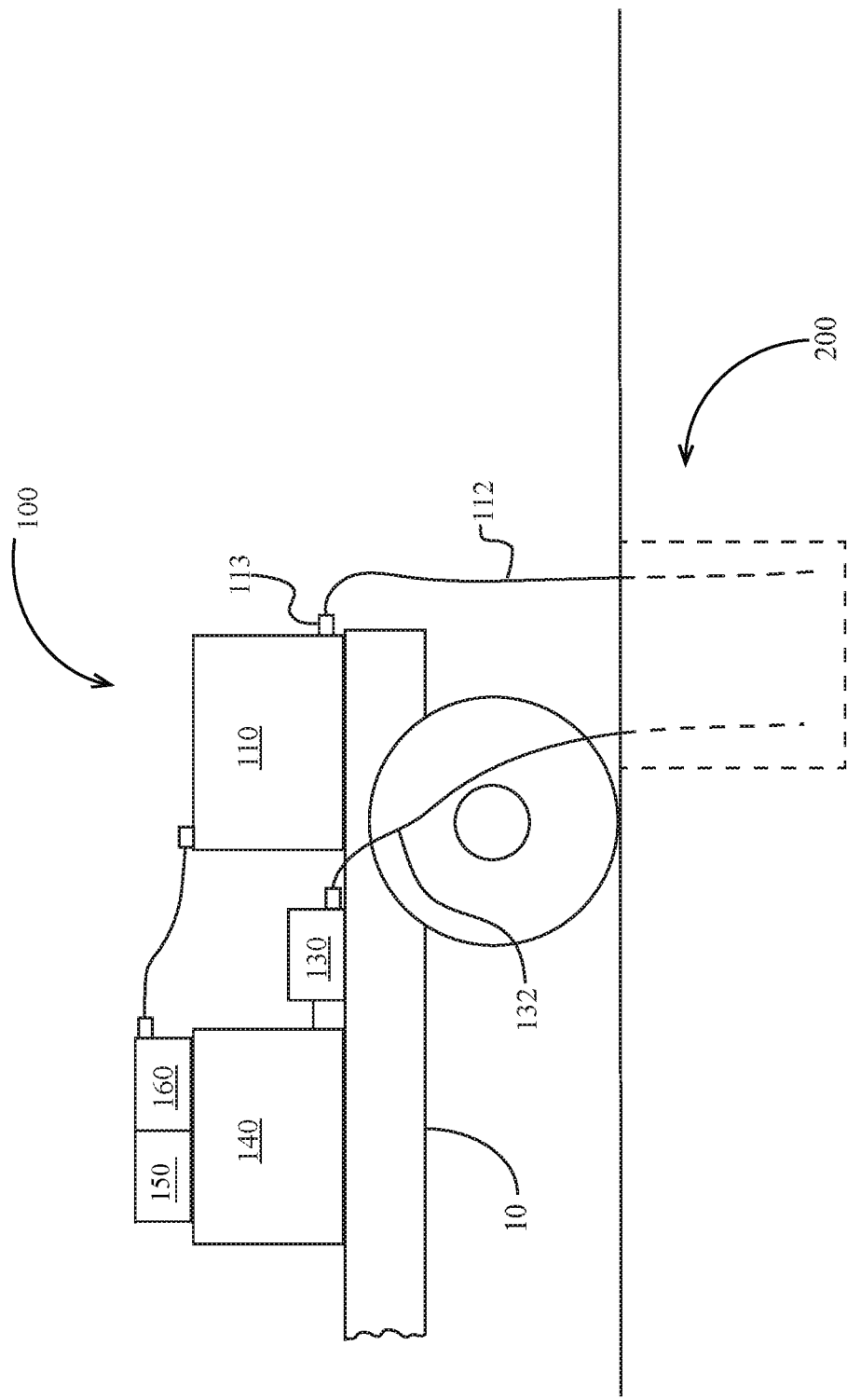

FLUID STORAGE TESTING APPARATUS, SYSTEMS, AND METHODS

BACKGROUND

Fluid storage testing is carried out in order to identify leaks or other failures of fluid storage volume such as a fuel storage tanks.

BRIEF DESCRIPTION OF THE DRAWINGS

FIG. 2 is a partial side elevation view of the fluid storage testing system of FIG. 1 supported on an embodiment of a trailer.

DESCRIPTION

Figure 1:
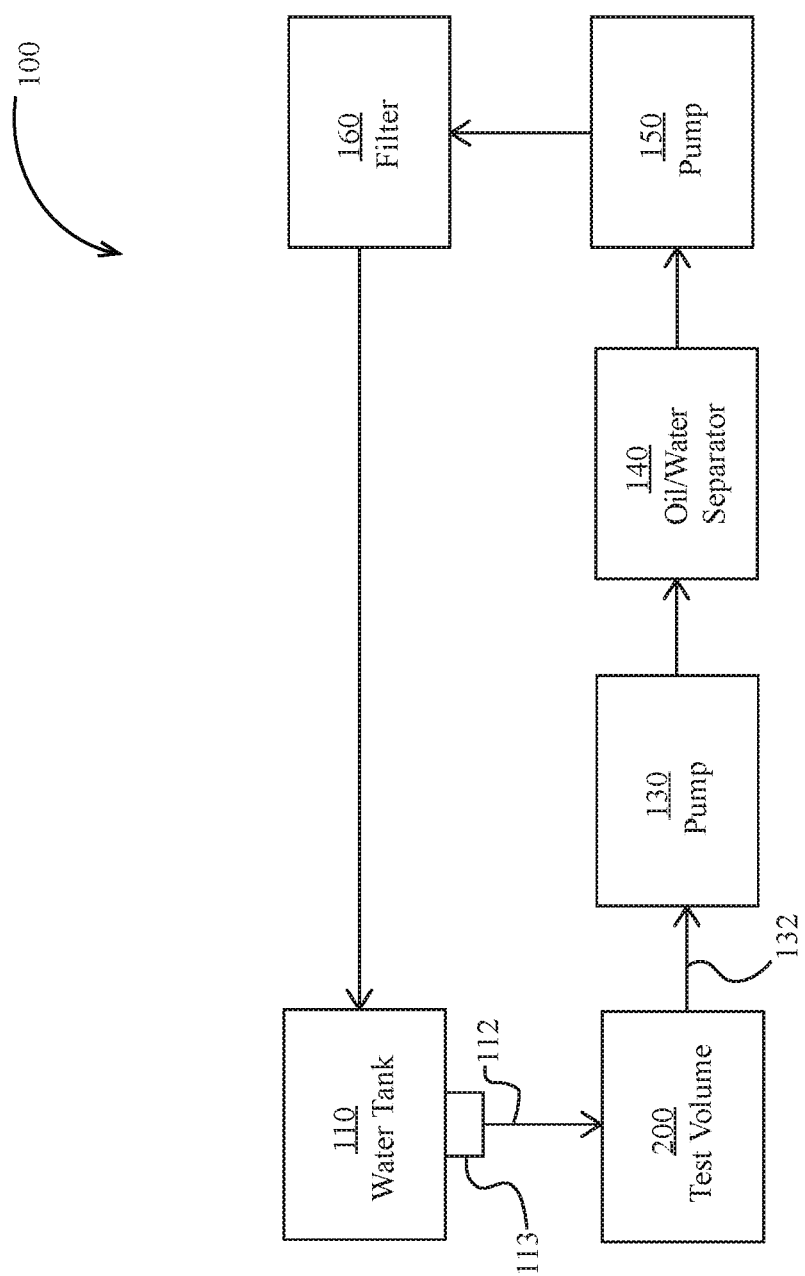
FIG. 1 schematically illustrates an embodiment of a fluid storage testing system.

Fluid storage testing systems, methods and apparatus are described herein. Some embodiments comprised a closed-circuit system and/or method. In some embodiments, water or other fluid is pumped to a storage volume from a water tank and then cleaned and returned to the water tank. In some embodiments the system is mobile (e.g., supported on a trailer or vehicle).

Referring to the drawings, wherein like reference numerals designate identical or corresponding parts throughout the several views, FIG. 1 illustrates a fluid storage testing system 100. The system 100 optionally includes a water tank 110 (or other fluid storage tank) which may have a size of 3 or more gallons, 5 or more gallons, 10 or more gallons, 20 or more gallons, 30 or more gallons, 50 or more gallons, or any suitable size or volume. The system 100 optionally includes a conduit 112. The conduit 112 (e.g., flexible tube, etc.) is optionally fluidly coupled to the water tank 110, e.g., at a first end of the conduit 112. The conduit 112 (e.g., a second end thereof) is optionally positionable in a fluid storage volume 200 (e.g., underground fluid storage volume such as a sump, spill bucket, etc. which may be part of a fueling station or other facility) for delivering water from the water tank 110 to the fluid storage volume 200 or to another location. Water optionally flows by gravity (e.g., by opening a valve 113 which optionally selectively fluidly couples the water tank 110 to the conduit 112) into the storage volume 200; in other embodiments, a pump or other device is optionally used to move water from the water tank 110 to the fluid storage volume 200.

In some embodiments, the system 100 further includes a pump 130 which may be placed in fluid communication with the test volume 200 for removing water from the test volume 200. The system 100 optionally includes a conduit 132 (e.g., flexible tube, etc.) which is optionally positionable (e.g. at a first end thereof) in the storage volume 200 and optionally fluidly coupled to the pump 130 (e.g., at a second end thereof).

In some embodiments, the system 100 further includes an oil/water separator 140 (e.g., an oil/water separator such as the RCT model available from Hydrasep in Hernando, Miss.) fluidly coupled to the pump 130. The oil/water separator 140 (e.g., a separated water container thereof) is optionally fluidly coupled to a pump 150. The pump 150 is optionally fluidly coupled to a filter 160. The filter 160 is optionally fluidly coupled to the water tank 110. The system 100 may be described as a closed-circuit system.

Referring to FIG. 2, the system 100 is shown supported on a trailer 10. In other embodiments the system 100 may be stationary or may be mobile and supported on a truck or other vehicle. In some implementations, the trailer 10 is moved (e.g., towed, driven) to a location near the storage volume 200 (e.g., near enough to insert the conduits 132, 112 into the storage volume). In some implementations, after performing one or more storage volume tests (e.g., leakage tests) on the storage volume 200, the system 100 may be moved to another location and/or storage volume in order to perform further testing. In some implementations, water transferred to the storage volume is 200 returned to the water tank 110. In some implementations, water returned to the water tank 110 is transferred to another storage volume for another test. In some implementations, water returned to the water tank 110 is disposed of (e.g., via the conduit 112) or simply retained for later usage.

An exemplary method of using the system 100 is described as follows. The water tank 110 is optionally fluidly coupled to the storage volume 200 (e.g., by placing conduit 112 in the storage volume 200). The pump 130 is optionally fluidly coupled to the storage volume 200 (e.g., by placing conduit 132 in the storage volume 200). The valve 113 is optionally opened to allow water into the storage volume 200. The valve 113 is optionally closed in order to stop the flow of water once a desired water level is reached in the storage volume 200. A testing period (e.g., 30 seconds, more than 30 seconds, 1 minute, more than 1 minute, 10 minutes, more than 10 minutes, one hour, more than 1 hour, etc.) can pass and the water level and/or storage volume 200 are examined to identify leaks in the storage volume. In some embodiments, additional or alternative tests may be performed on the water in the storage volume. The pump 130 is optionally turned on in order to lift water from the storage volume 200. The pump 130 optionally moves water to the oil water/separator 140 such that oil is collected in an oil container of the separator and water is collected in a water container of the separator. Water is optionally pumped from the water container of the separator 140 by the pump 150. Water is optionally pumped through the filter 160 by the pump 150. Water optionally travels (by pumping and/or by gravity) back to the water tank 110. This method may be described as a closed-circuit method.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A closed-circuit storage volume testing system for testing a storage volume, the system configured to be carried by a vehicle, the system comprising:
   a water tank carried by the vehicle, said water tank being in fluid communication with a first conduit, said first conduit capable of fluid communication with the storage volume;
   a pump carried by the vehicle, said pump being in fluid communication with a second conduit, said second conduit capable of fluid communication with the storage volume; and
   an oil/water separator carried by the vehicle, wherein said oil/water separator is in fluid communication with said water tank via a second pump.

2. The system of claim 1, further comprising a filter in fluid communication with said second pump and said water tank, said filter being carried by the vehicle.

3. The system of claim 1, wherein said second conduit is capable of fluid communication with an underground portion of the storage volume.

4. The system of claim 3, wherein at least one of said first and second conduits comprises a flexible conduit.

5. A closed-circuit storage volume testing method for testing a storage volume, the method comprising:
   moving water from a water tank to the storage volume;
   performing at least one test on the storage volume;
   pumping water from the storage volume to an oil/water separator;
   pumping water through a filter; and
   moving water back to the water tank.

6. The method of claim 5, further comprising:
   transporting the water tank away from the storage volume.

7. The method of claim 6, wherein said test comprises a leakage test.

8. The method of claim 5, wherein said test comprises a leakage test.

9. The method of claim 5, further comprising:
   transporting the filter away from the storage volume.

10. The method of claim 9, further comprising:
    transporting the oil/water separator away from the storage volume.

* * * * *